United States Patent [19]

Colombo

[11] 4,260,935
[45] Apr. 7, 1981

[54] CIRCUIT ARRANGEMENT FOR SUPPRESSING CRT BEAM IN TELEVISION RECEIVER

[75] Inventor: Antonio Colombo, Tradate, Italy

[73] Assignee: SGS Ates Componenti Elettronici S.p.A., Agrate Brianza, Italy

[21] Appl. No.: 73,088

[22] Filed: Sep. 6, 1979

[30] Foreign Application Priority Data

Sep. 7, 1978 [IT] Italy .............................. 27399 A/78

[51] Int. Cl.³ ............................................ H01J 29/52
[52] U.S. Cl. .................................... 315/381; 315/384
[58] Field of Search ................ 315/387, 381, 383, 384

[56] References Cited

U.S. PATENT DOCUMENTS 4,176,301  11/1979  Sonnenberger ...................... 315/384

OTHER PUBLICATIONS

Philips, Technical Note 078, *TDA2652-Integrated Vertical Deflection for 30AX.*

*Primary Examiner*—Theodore M. Blum
*Attorney, Agent, or Firm*—Karl F. Ross

[57] ABSTRACT

For the periodic suppression of the beam of a cathode-ray tube in a television receiver during flyback, in response to a blanking pulse $V_2$ normally accompanied by a flyback pulse $V_1$ of shorter duration, a control transistor $T_{11}$ is saturated to render conductive a master transistor $T_7$ in series therewith, together with several slave transistors $T_6$, $T_8$ and $T_{13}$ forming current mirrors with transistor $T_7$. Slave transistor $T_{13}$ lies in series with a Zener diode DZ across which the beam-suppressing signal $V_3$ is generated; slave transistor $T_6$ activates a comparator CMP having an input A connected to a biasing circuit PL1 including slave transistor $T_8$. Another input B of the comparator receives from a voltage divider PL2 a biasing voltage of such magnitude that an output C of the comparator feeds back a holding signal to another control transistor $T_{12}$, in parallel with transistor $T_{11}$, to maintain the conduction of master transistor $T_7$ until a flyback pulse $V_1$ applied to biasing circuit PL1 reverses the comparator whereby the beam-suppressing signal $V_3$ disappears with the blanking pulse $V_2$. In the absence of flyback pulse $V_1$, signal $V_3$ persists for an indefinite period.

8 Claims, 5 Drawing Figures

CIRCUIT ARRANGEMENT FOR SUPPRESSING CRT BEAM IN TELEVISION RECEIVER

FIELD OF THE INVENTION

My present invention relates to a circuit arrangement for the suppression of the beam of a cathode-ray tube in a televisions receiver during flyback as well as in the event of a malfunction.

BACKGROUND OF THE INVENTION

Conventional sweep circuits used for horizontal and vertical scanning in television receivers periodically emit a blanking pulse, derived from the sawtooth voltage of a respective ramp generator, in order to suppress the beam during its return stroke.

If, for any reason, the vertical-sweep generator fails to operate properly so that the beam oscillates along a single horizontal line of the CRT screen, the sensitive layer of that screen may be irreparably damaged unless the beam is promptly extinguished. It has therefore already been proposed to provide protective circuitry for suppressing the beam whenever a flyback pulse, normally developed across the vertical-deflection yoke of the CRT within the blanking period, fails to materialize. Such a system generally comprises a storage capacitor chargeable by a guard circuit in response to the flyback pulse; in the discharged state of the capacitor, the blanking pulse is extended into a continuous d-c voltage whereby the beam is permanently cut off. See, for example, Technical Note 078 by N. V. Philips'Gloeilampenfabrieken (1978) relating to the integrated vertical-deflection module known as TDA2652.

The storage capacitor used with such a prior-art guard circuit must be fairly large, with a capacitance of at least one microfarad. Such capacitors cannot be incorporated in an integrated-circuit module and are therefore designed as separate circuit components connected to the i-c chip via an external terminal.

OBJECTS OF THE INVENTION

The general object of my present invention, therefore, is to provide a circuit arrangement of the type referred to which obviates the need for a separate capacitor designed to store the flyback pulse.

A related object is to provide a more compact unit of this description which is realizable entirely by integrated circuitry.

SUMMARY OF THE INVENTION

In accordance with my present invention I provide a normally deactivated comparator with a first signal input for receiving a switching signal from a first biasing circuit and a second signal input for receiving a reference signal from a second biasing circuit. A control circuit with an output connection extending to an activating input of the comparator receives the blanking pulse from the sweep circuit via an input connection and a holding signal from the comparator via a feedback connection whenever that comparator is activated in response to such a blanking pulse to assume a first operational state; the holding signal then maintains that operational state independently of the blanking pulse. This first biasing circuit is coupled to switchover means such as a shunt transistor connected to receive the flyback pulse and, in response to that pulse, modifies the switching signal emitted by it to establish a second operational state of the comparator with concurrent disablement of the feedback connection to the control circuit. Thus, the disappearance of the blanking pulse (whose duration exceeds that of the accompanying flyback pulse) restores the control circuit to normal and deactivates the comparator. If the flyback pulse fails to arrive, the comparator remains active and continues to enable an associated output circuit which generates a beam-suppressing signal in both the first and the second operational state thereof.

According to a more specific feature of my invention, the output connection of the control circuit includes a master transistor and several slave or follower transistors which are interconnected in a current-mirror configuration, one such slave transistor being connected to the activating input of the comparator for energizing same upon conduction of the associated master transistor. Another slave transistor so associated may form part of the first biasing circuit and of the output circuit which generates the beam-suppressing signal.

BRIEF DESCRIPTION OF THE DRAWING

The above and other features of my invention will now be described in detail with reference to the accompanying drawing in which.

SPECIFIC DESCRIPTION

Figure 1:
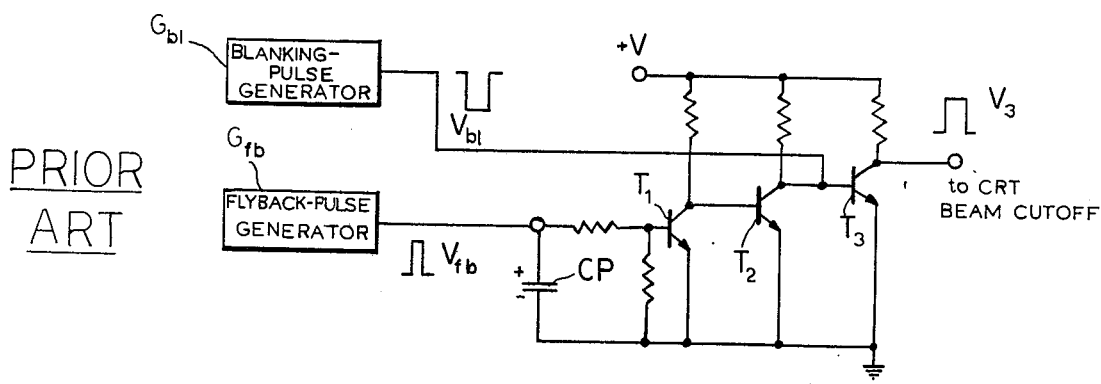
FIG. 1 is a block diagram of a conventional guard circuit for suppressing the beam of a CRT tube.

In FIG. 1 I have shown a conventional beam suppressor, such as the above-mentioned guard circuit of the TDA2652 modlule, receiving a recurrent blanking pulse $V_{b1}$ of negativve polarity from a generator $G_{b1}$ and an accompanying flyback pulse $V_{fb}$ of positive polarity, of shorter duration, form another generator $G_{fb}$. The flyback pulse $V_{fb}$ is applied to the base of a PNP transistor $T_1$ connected in cascade with two similar transistors $T_2$ and $T_3$; all three transistors have their collector/emitter paths connected in parallel, through respective series resistors, across a source of d-c voltage +V. An R/C network in the input of transistor $T_1$ includes a storage capacitor CP which is charged by recurrent flyback pulses $V_{fb}$ so as to saturate the transistor $T_1$ whereby transistor $T_2$ is cut off and transistor $T_3$ conducts, except in the presence of a blanking pulse $V_{b1}$ applied to its base to override the voltage +V on the collector of transistor $T_2$ whereby a positive beam-suppressing pulse $V_3$ appears on the collector of transistor $T_3$. Generator $G_{b1}$ is driven by a nonillustrated sawtooth oscillator included in the vertical-sweep circuit associated with the cathode-ray tube of a television receiver whose beam is to be cut off during flyback and in the event of a malfunction of that sweep circuit, as discussed above. Generator $G_{fb}$ may comprise a small capacitor connected across the vertical-deflection yoke of that cathode-ray tube, as in the aforedescribed TDA2652 module. Capacitor CP, as noted above, constitutes an extraneous component of the guard circuit represented by transistors $T_1$–$T_3$.

Figure 2:
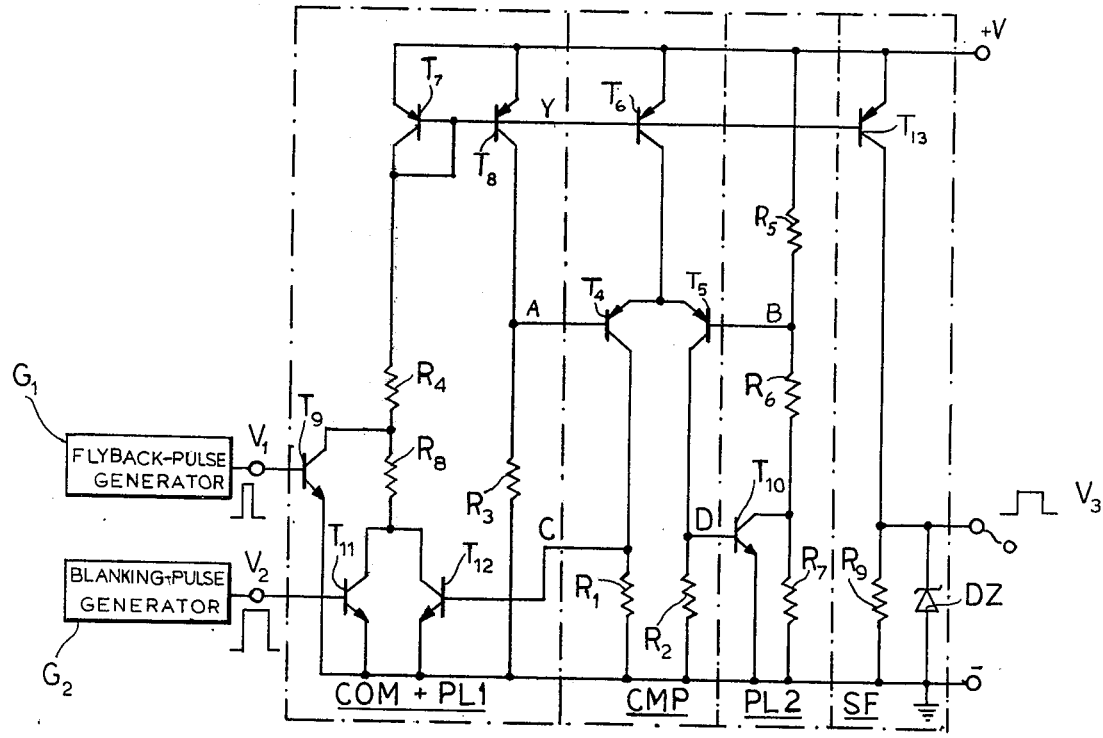
FIG. 2 is a circuit diagram of a protective arrangement embodying my invention, having the same purpose as the device of FIG. 1 but consisting only of resistors and electronic switches realizable by integrated circuitry.

In FIG. 2 I have shown a pair of generators $G_1$ and $G_2$ which are similar to components $G_{b1}$ and $G_{fb}$ of FIG. 1 but produce a flyback pulse $V_1$ and a blanking pulse $V_2$ both of positive polarity. These two pulses have also been illustrated in the timing diagrams of FIGS. 4a and 4b which indicate that the blanking pulse $V_2$ lasts for a longer period $t_1-t_4$ than the accompanying flyback pulse $V_1$ occurring between times $t_2$ and $t_3$; the two pulse widths may be 1.2 msec. and 0.5 msec., respectively. The illustrated offset $t_1-t_2$ between the leading edges of pulses $V_2$ and $V_1$ is not essential for the operation of the system but will generally occur in practice.

Figure 3:
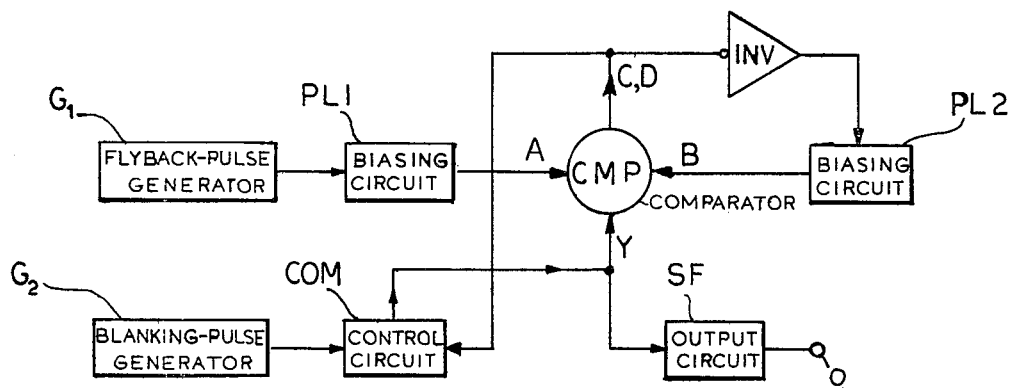
FIG. 3 is a generalized representation, in block form, of the circuitry shown in FIG. 2.

The integrated circuitry shown in FIG. 2, serving to derive beam-suppressing signals from flyback and blanking pulses $V_1$ and $V_2$, may be conceptually subdivided into five components also illustrated in block form in FIG. 3, namely a comparator CMP, first and second biasing circuits PL1, PL2, a control circuit COM and an output circuit or final stage SF, all inserted between ground and a positive supply terminal $+V$. Components COM and PL1 share common circuit elements and have therefore not been separately indicated in FIG. 2. p Comparator CMP has two signal inputs A and B represented by the bases of respective PNP transistors $T_4$ and $T_5$ whose emitters are connected in parallel to the collector of a similar transistor $T_6$ and whose collectors are grounded via respective series resistors $R_1$ and $R_2$. PNP transistor $T_6$ is one of four such transistors with emitters joined to supply terminal $+V$ and with bases interconnected by a lead Y in a current-mirror configuration; the remaining transistors of this configuration have been designated $T_7$, $T_8$ and $T_{13}$, with transistor $T_7$ acting as the master and the others serving as followers. The collector of master transistor $T_7$, tied to lead Y, is connected by way of a voltage divider $R_4$, $R_8$ to the emitters of two NPN transistors $T_{11}$, $T_{12}$ inserted in parallel between that voltage divider and ground, these latter transistors forming part of control circuit COM. A shunt transistor $T_9$, also of NPN type, has its collector tied to the junction of resistors $R_4$, $R_8$ and its emitter grounded. Transistor $T_9$, whose base receives the flyback pulse $V_1$ from generator $G_1$, conducts only in the presenc of that pulse to switch over the comparator CMP from a first to a second operational state as described hereinafter.

Slave transistor $T_8$ has its collector connected to the base of transistor $T_4$ at comparator input A from which a biasing resistor $R_3$ extends to ground. The opposite input B, i.e. the base of transistor $T_5$, is connected to the junction of two series resistors $R_5$ and $R_6$ forming with a further series resistor $R_7$ a voltage divider inserted between terminal $+V$ and ground. This voltage divider is part of biasing circuit PL2, as is an NPN transistor $T_{10}$ which constitutes an electronic bypass switch connected across resistor $R_7$. The collectors of the two symmetrical comparator transistors $T_4$ and $T_5$ are respectively joined to the base of transistor $T_{12}$ via a lead C and to the base of transistor $T_{10}$ via a lead D; lead C constitutes a feedback connection delivering a holding signal to control circuit COM as will also be described hereinafter.

Slave transistor $T_{13}$ is part of output circuit SF and has its collector grounded through a resistor $R_9$ in parallel with a Zener diode DZ. The output terminal 0 of the system, producing the beam-suppressing signal, lies at the junction of the collector of transistor $T_{13}$ with impedance network $R_9$, DZ.

Figures 4A, 4B:
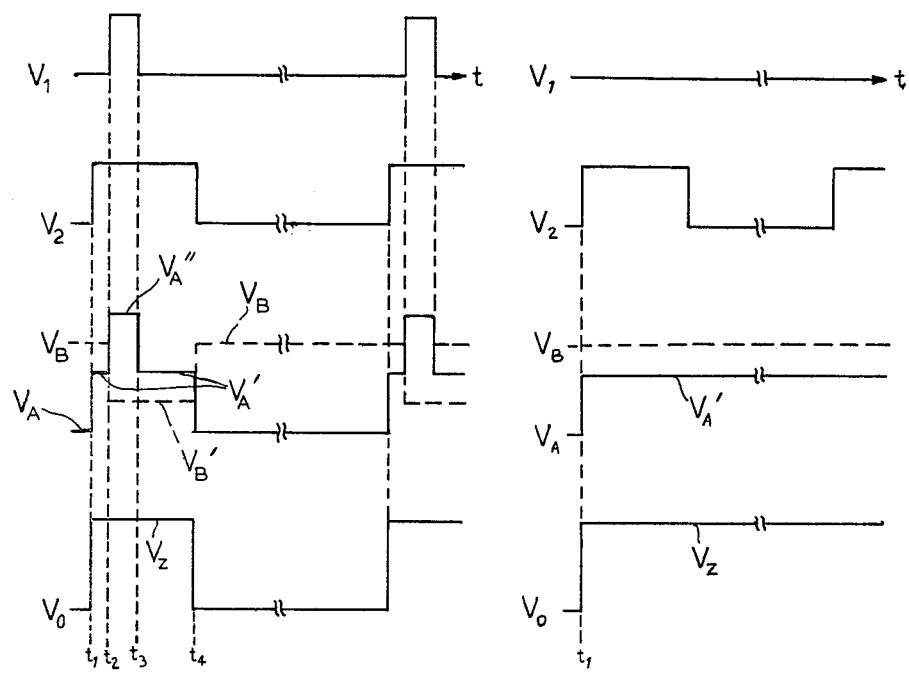
FIGS. 4a and 4b are two sets of graphs depicting the mode of operation of the system of FIG. 2 under normal and under abnormal circumstances, respectively.

Normally, i.e. in the absence of pulses $V_1$ and $V_2$, transistors $T_{11}$, $T_{12}$ of control circuit COM are cut off whereby master transistor $T_7$ and the associated slave transistors $T_6$, $T_8$ and $T_{13}$ are likewise nonconducting. The potential of comparator input A, shown at $V_A$ in FIG. 4a, is then at ground level and well below the magnitude of the reference signal $V_B$ applied to the other input B by biasing circuit PL2. Neither of transistors $T_4$ and $T_5$ conducts at this stage, however, in view of the cutoff of transistor $T_6$. Shunt transistor $T_9$ and bypass transistor $T_{10}$ are also nonconducting; the voltage of output terminal 0 is likewise at ground level as seen at $V_o$ in FIG. 4a.

At instant $t_1$, the appearance of a blanking pulse $V_2$ turns on the control transistor $T_{11}$ whereby the base connection Y in the output of circuit COM is driven more negative and causes the current-mirroring transistors $T_6$, $T_7$, $T_8$ and $T_{13}$ to conduct. The potential of input A now rises to a level $V_{A'}$ which is still less than the reference voltage $V_B$ of terminal B. This establishes the first operational state of comparator CMP in which transistor $T_4$ conducts and supplies a holding voltage via feedback connection C to control transistor $T_{12}$, saturating it in parallel with the already saturated transistor $T_{11}$. Current passing through transistor $T_{13}$ generates across output resistor $R_9$ a voltage drop exceeding the threshold of Zener diode DZ whereby the latter breaks down and gives rise to a positive beam-suppressing pulse $V_3$ represented in FIG. 4a by a rise of the potential of terminal 0 to a level $V_z$.

The appearance of a flyback pulse $V_1$ at instant $t_2$ saturates the shunt transistor $T_9$ and short-circuits the resistor $R_8$ so as to increase the conductivity of transistors $T_6$, $T_7$, $T_8$ and $T_{13}$. The higher biasing current now traversing the resistor $R_3$ raises the potential of point A to a level $V_{A''}$ exceeding that of point B. This cuts off the PNP transistor $T_4$ and cuts in its companion transistor $T_5$, thereby de-energizing the feedback connection C and saturating the bypass transistor $T_{10}$ so as to lower the reference voltage at point B to a level $V_{B'}$ well below the level $V_{A'}$ which marks the first operational state of comparator CMP. In this second operational state of the comparator, control transistor $T_{12}$ is cut off although transistor $T_{11}$ remains saturated until blanking pulse $V_2$ disappears.

At instant $t_3$, the termination of flyback pulse $V_1$ effectively reinserts the resistor $R_8$ in the collector lead of master transistor $T_7$, thereby raising once more the potential of lead Y so that the switching voltage at point A is again lowered to its previous level $V_{A'}$. Since, however, point B is still more negative than point A, the state of comparator CMP does not change until instant $t_4$ when the trailing edge of blanking pulse $V_2$ restores the original condition of the system.

If flyback pulse $V_1$ had not arrived in the interval $t_1-t_4$, comparator CMP would have remained in its first operational state with voltages of points A and B at their respective levels $V_{A'}$ and $V_B$, as shown in FIG. 4b. The output signal on terminal 0 would therefore have remained at its high level $V_z$ instead of returning to ground potential $V_o$ as in FIG. 4a, thereby continuing the suppression of the beam of the associated cathode-ray tube.

Whereas in FIG. 2 the comparator CMP is shown to have two separate output leads C and D respectively extending to control circuit COM and biasing circuit PL2, it will be apparent that these two leads could be replaced by a single output connection with two branches, one of them including an inverter INV, as illustrated in FIG. 3.

Although my improved beam suppressor is primarily intended for the vertical-deflection circuit of a television receiver, it will be understood that an analogous arrangement can be provided for the horizontal sweep.

I claim:
1. In a television receiver including a cathode-ray tube whose beam is periodically deflected by a sawtooth-shaped scanning signal from a sweep circuit also generating a periodic blanking pulse fed to a circuit arrangement for suppressing said beam during a return stroke marked by the appearance of a flyback pulse of shorter duration than said blanking pulse, the improvement wherein said circuit arrangement comprises:

normally deactivated comparison means provided with an activating input, a first signal input and a second signal input;

first biasing means connected to said first signal input for applying a switching signal thereto:

second biasing means connected to said second signal input for applying a reference siganl thereto:

control means with an input connection to said sweep circuit for receiving said blanking pulse therefrom and with an output connection to said activating input for establishing a first operational state of said comparison means in response to said blanking pulse, said comparison means being provided with a feedback connection to said control means for maintaining said first operational state independently of said blanking pulse:

switchover means connected to receive said flyback pulse and coupled to said first biasing means for modifying said switching singal to establish a second operational state of said comparison means in response to said flyback pulse with concurrnet disablement of said feedback connection whereby said comparison means is deactivated upon the disappearance of said blanking pulse; and output circuitry connected to said control means for generating a beam-suppressing signal in both said first and second operational states thereof.

2. The improvement defined in claim 1 wherein said output connection includes a master transistor and a slave transistor interconnected in a current-mirror configuration, said slave transistor being connected to said activating input for energizing same upon conduction of said master transistor.

3. The improvement defined in claim 2 wherein said control means further includes a pair of parallel transistors in series with said master transistor, said input connection terminating at one of said parallel transistors, said feedback connection terminating at the other of said parallel transistors.

4. The improvement defined in claim 3 wherein said first biasing means comprises another slave transistor interconnected with said master transistor in a current-mirror configuration, said output connection further including a resistor in series with said parallel transistors and said master transistor, said switchover means comprising an electronic shunt switch connected across said resistor for short-circuiting same in the presence of said flyback pulse to modify said switching signal.

5. The improvement defined in claim 1, 2, 3 or 4 wherein said second biasing means comprises a voltage divider and an electronic bypass switch connected across part of said voltage divider and coupled to an output lead of said comparison means for modifying said reference signal upon a changeover from said first to said second operational state.

6. The improvement defined in claim 5 wherein said comparison means comprises a pair of symmetrical transistors with emitters connected in parallel to said activating input, with bases constituting said first and second signal inputs, and with collectors respectively joined to said feedbakc connection and to said output lead.

7. The improvement defined in claim 2, 3 or 4 wherein said output circuitry includes a further slave transistor, interconnected with said master transistor in a current-mirroring configuration, and impedance means in series with said further slave transistor.

8. The improvement defined in claim 7 wherein said impedance means comprises a resistor shunted by a Zener diode.

* * * * *